March 14, 1939. N. T. KASZAB 2,150,225
SCREEN FOR STEREOSCOPIC PICTURES
Filed July 20, 1937
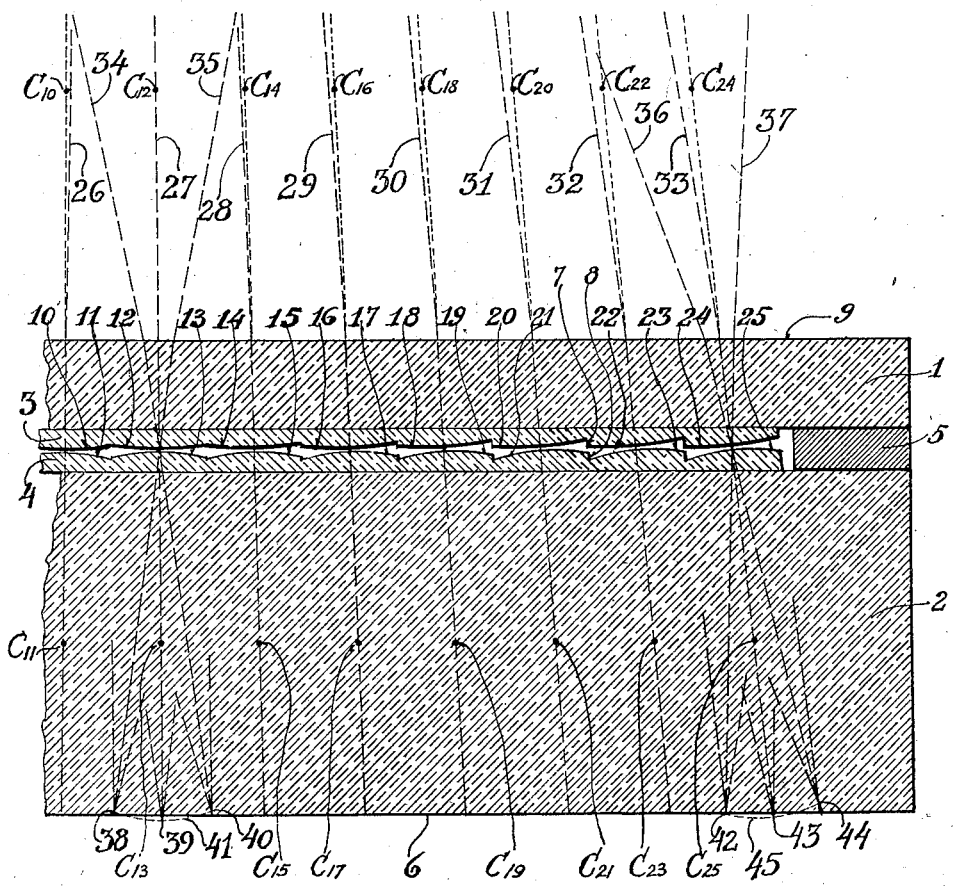
Nicholas T. Kaszab,
INVENTOR.
BY Julian J. Wittal,
his ATTORNEY Patented Mar. 14, 1939

2,150,225

UNITED STATES PATENT OFFICE 2,150,225

SCREEN FOR STEREOSCOPIC PICTURES

Nicholas T. Kaszab, New York, N. Y.

Application July 20, 1937, Serial No. 154,592

2 Claims. (Cl. 88—24)

This invention relates to stereoscopic pictures to be viewed with the unaided eyes through a corrugated optical screen and more specifically to the screen itself.

The main object of this invention is to provide novel means to improve the definition and to increase the stereoscopic depth and limits of the viewing angle of such screens.

Another object of this invention is to provide improved stereoscopic screens both for still and moving pictures.

Still another object of my invention is to provide improved screens for changing pictures.

In order to show the importance and usefulness of my invention, I will now describe and enumerate the limitations and drawbacks of the simple corrugated screens heretofore proposed.

Simple cylindrical refracting elements as the composing parts of the corrugation do not focus in sharp lines when used in those widths which are a requirement of the stereoscopic pictures just characterized. Even light rays parallel to the optical axes of such elements, will register as a relatively wide line on the sensitized surface. Since a stereoscopic photograph made through a corrugated screen consists of picture-stripe elements, one for each cylindrical refracting element, the problem arises how to arrange the relatively wide focal-lines within one limited stripe element which is not more than ten times wider than the said focal-lines. Since each focal-line is the condensed element of a non-stereoscopic picture, no more than ten unblended pictures may be projected from different angles into the stereoscopic picture. In stereoscopic pictures made of ten or less unblended units, however, there is, in the transit from one viewing angle to another, a perceptible discontinuity which increases with the apparent distance of the displayed object from the actual plane of the picture. If one insists to crowd in more pictures than there is space for, the result will be a blurred effect which also will increase with the stereoscopic depth. In either case the practicable depth of the stereoscopic image is limited to less than six inches. If, for example a head is shown in natural size, the nose will be well defined, but the ears will appear to have several contours or will be blurred, which blurred effect gives a jellylike character to stereoscopic pictures. The limitation as to the depth also limits the field of this art to miniature size objects.

It is also to be noted that with simple screens picture will be produced on a flat surface, resulting in different grades of blurring when the stereoscopic picture is viewed from different angles depending on where the picture plane intersects the curved focal-surfaces.

The focusing problem becomes even more difficult toward the right and left margins of the picture where the light rays form a larger angle with the optical axes of the cylindrical elements than at or near the center of the picture, resulting in about two or three times wider focal lines than at the center of the picture. This latter circumstance greatly limits, both, the viewing angle and the width of the pictures using simple corrugated screens.

Broadly stated, I propose for means for sharp focusing to use two or more corrugated surfaces, the cylindrical refracting elements in them constituting coordinated pairs or groups with reference to their width and respective radii, thereby increasing the number of unblended pictures about six to twenty times as compared with the simple corrugated screen. The flattening of the curved focal surfaces the second improvement, is also accomplished by the means just proposed.

To even out or equalize focusing differences between the center and the extremities of the picture, I arrange the cylindrical refracting elements in such a manner that their optical axes constitute a radial system by gradually changing the angles of said elements, starting at the center of the screen, with gradually increasing plane shoulders between them. This will increase the possible width of the picture.

To increase the viewing angle of the picture beyond the limit set by curved refracting means, I propose to place the plane surface of a corrugated sheet to the outside, so as to use it as a refracting surface, thereby increasing by about one third the maximum angle.

In its preferred embodiment the invention comprises of two transparent corrugated sheets the corrugations facing each other. Each pair of opposite cylindrical elements has a common optical axis and said pairs of elements are gradually changed in their angular relations to their respective planes in such a manner that said optical axes constitute a radial system with a distant center. The length of the radii of the opposite curvatures and the width of said curved elements and also the thickness of the inner corrugated sheet are coordinated dimensions.

In the drawing:

the refractory elements shown being greatly reduced and the dimensions of the parts greatly enlarged, the refraction of the light rays also being indicated.

Referring now more particularly to the figure, the numeral 1 denotes a transparent plate preferably made of glass and character 9 the outer plane of said glass plate 1 facing the camera or the viewer as the case may be and is the first refracting surface of the screen. The thickness of said glass plate 1 may be chosen as desired, it having no optical implications.

The numeral 2 represents another transparent plate, preferably of glass, and its thickness is chosen with reference to the other elements in the screen. 6 denotes the plane of the picture whether it is a projected picture in which case 6 is a ground glass surface or a picture made directly on the screen in which case 6 is a sensitized surface. When the picture is made on a sensitized sheet, the numeral 6 indicates a plain glass surface. 3 and 4 indicate thin sheets or films of transparent plastic material preferably having a refraction index identical with that of the plates 1 and 2. Said plastic sheets or layers 3 and 4 may be attached to the respective glass plates 1 and 2, or they may be produced on the glass surfaces themselves by a wet process from a solution. 10, 12, 14, 16, etc. and 11, 13, 15, 17, etc. are cylindrical surfaces impressed into the respective plastic sheets 3 and 4. The dots marked with letters C in the figure denote lines parallel to the corrugations which constitute the central axes of the curvatures of the cylindrical surfaces 10, 12, etc. respectively and 13, 15, etc. For the sake of brevity and to differentiate from "axis" in its optical meaning, I will refer to said C's as centers of curvature, that is the way they appear in the figure. The various letters C are marked with the respective numbers of the curvatures of which they are the centers. The line connecting C12 and C13 is perpendicular to the planes of the glass sheets 1 and 2 and indicates the plane of symmetry of the screen. The lines connecting the centers C10 and C11, C14 and C15, etc. are increasingly deviating from said perpendicular and meet in a distant imaginary point (not shown), thereby constituting a radial system. Said lines C10—C11; C12—C13; C14—C15, etc. are the common optical axes of the corresponding pairs of cylindrical lenses, 10 and 11, 12 and 13, 14 and 15, and so forth. The said center of the radial system is predetermined by practical considerations depending on the desired distances and angles from which the picture is likely to be viewed. 7 and 8 are minute plane breaks or shoulders separating the respective curved surfaces so arranged as to be along the respective radii of the said radial system. The widths of said breaks are near zero at the center and gradually increase toward the right and left of the screen. Light rays in the process of making or viewing the picture when meeting said minute breaks 7 and 8 will cause a certain degree of scattering of rays but even in the worst condition prevailing at the extreme right and left said scattering will be a negligible quantity. The effectiveness of said scattered rays is further reduced when producing the picture by means of a color in the plastic material of the master-screen.

Said color in the plastic material will also correct the color dispersion of the cylindrical refracting elements. A dividing strip 5 is inserted between the glass sheets 1 and 2, made of any suitable material and has for its purpose to keep the corrugations from pressing against each other.

26, 27, etc., to 33 represent light rays converging in or diverging from a point (not shown) in the process of making or viewing the picture, respectively, said point being the location of the camera lens in its central position when the picture is made. The light rays 26 to 33 are refracted at the surface 9 of glass plate 1 in such a manner that they will proceed further in the lines of the respective optical axes C12—C13, C14—C15, etc. 34 and 36 are light rays diverging from a point (not shown) which is the location of the camera lens in its extreme left position. 35 and 37 are light rays diverging from the extreme right position of the camera lens. Rays 34 and 35 are said extreme left and right rays passing through the center of the screen, and 36 and 37 the extreme rays passing through the center of the outermost right element, and they proceed in symmetrical relation to the respective optical axes C12—C13 and C24—C25. By virtue of this arrangement the effectiveness of the cylindrical refracting surfaces is equalized through the whole width of the screen. It will be seen, that if the proportional relation between the radii of the opposite curvatures and the widths of said curvatures is chosen according to rules known to optical science all the other rays not indicated by numbers will meet in what for practical purposes may be considered mathematical lines, denoted by the points 38, 39, 40 and 42, 43, 44, located in curved surfaces 41 and 45, respectively, for said two elements shown as examples, the curvatures being very flat, as desired.

What I claim as new, is:

1. A stereoscopic screen, comprising a front plate and an adjacent back plate, both made of transparent material and each having on their respective oppositely placed inner sides convex cylindrical lenticulations in parallelism, and minute plane breaks between the cylindrical elements of the lenticulations, the spacing of the axes of curvatures of the cylindrical elements being equal for each plate, but being wider for the back plate than for the front plate and the radii of curvatures of the lenses being of equal length for each plate, but longer for the front plate than for the back plate; the two systems of lenticulations being so arranged that they form opposing pairs of cylindrical lenses, the lenses of each pair being in tangential relation to one another, each pair also being symmetrical with relation to a respective plane containing the respective axes of the curvatures of the two lenses, all said planes of symmetry converging to intersect in a predetermined central line at a desired distance in front of the screen, the radii of curvatures being so dimensioned that the focal length of each of the opposing pairs of lenses is equal to the thickness of the back plate, and the radii of curvatures of the lenses on the two respective plates having a ratio adapted to reduce cylindrical aberration.

2. In a screen, as set forth in claim 1, said ratio of the radii or curvatures of the lenses being 2 to 1.

NICHOLAS T. KASZAB.